(12) United States Patent
Bucey et al.

(10) Patent No.: US 6,691,410 B2
(45) Date of Patent: Feb. 17, 2004

(54) METHOD OF INSPECTING A GEOMETRY AND DIMENSIONAL ACCURACY OF A CIRCULAR RECUPERATOR INSPECTION FIXTURE

(75) Inventors: Charles W. Bucey, San Diego, CA (US); Gregory D. Gleason, Oceanside, CA (US)

(73) Assignee: Solar Turbines Inc, San Diego, CA (US)

( * ) Notice: Subject to any disclaimer, the term of this patent is extended or adjusted under 35 U.S.C. 154(b) by 22 days.

(21) Appl. No.: 09/999,711

(22) Filed: Oct. 31, 2001

(65) Prior Publication Data

US 2003/0079326 A1 May 1, 2003

(51) Int. Cl.$^7$ ................................................. B23P 15/00
(52) U.S. Cl. ............................ 29/890.034; 29/407.05; 29/407.09
(58) Field of Search ..................... 29/890.034, 890.03, 29/407.01, 407.05, 407.09, 407.1; 165/166, 165, 145; 60/39.5, 39.511

(56) References Cited

U.S. PATENT DOCUMENTS

| | | | | |
|---|---|---|---|---|
| 5,060,721 A | * | 10/1991 | Darragh | 165/165 |
| 5,081,834 A | * | 1/1992 | Darragh | 60/39.511 |
| 5,918,368 A | * | 7/1999 | Ervin et al. | 29/890.03 |
| 6,112,403 A | * | 9/2000 | Ervin et al. | 29/726 |
| 6,158,121 A | * | 12/2000 | Ervin et al. | 29/890.034 |

* cited by examiner

Primary Examiner—I. Cuda-Rosenbaum
(74) Attorney, Agent, or Firm—Larry G Cain

(57) ABSTRACT

An inspection fixture and line is used to accurately determine the geometry and dimensional accuracy of a circular recuperator core. With the fixture and line inspection of a length, an inner diameter and an outer diameter of the circular recuperator core are completed. The method of using the fixture and the line further insures the concentricity of a donor inlet duct and a donor outlet duct.

16 Claims, 6 Drawing Sheets

METHOD OF INSPECTING A GEOMETRY AND DIMENSIONAL ACCURACY OF A CIRCULAR RECUPERATOR INSPECTION FIXTURE

TECHNICAL FIELD

This invention relates generally to a heat exchanger or recuperator and more particularly to a method for inspecting the geometry and dimensional accuracy of the heat exchanger or recuperator.

BACKGROUND

Many recuperator are of a primary surface construction. In a primary surface recuperator or heat exchanger, a plurality of thin sheets are stacked in a spaced apart configuration to form a cell. The cells are assembled, such as by welding to form a core. Each core has a plurality of ducts connected thereto in a preestablished position or location. The core and ducts are used with an engine and are positioned within a donor flow path. The donor flow path usually has a preestablished configuration and size. Additional ducting of the engine enables recipient flow to pass through the core. The additional ducting also has a preestablished configuration and size. Thus, to physically fit and mesh with the engine ducting configuration the size and shape of the recuperator or heat exchanger must be controlled.

U.S. Pat. No. 5,060,721 issued on Oct. 29, 1991 to Charles T. Darragh discloses an example of one such recuperator or heat exchanger. The recuperator disclosed in this patent has a circular configuration. The recuperator has the above mention cells made from a plurality of primary surface sheets, a plurality of spacer bars, and a plurality of guide strips. The component parts are welded together to form the recuperator. The welding of the component parts makes it difficult to maintain a preestablished configuration along with a plurality of demanding but necessary tolerances.

Thus, to insure the preestablished configuration and tolerance, a method is needed to insure the configuration and tolerance is maintained. By maintaining the configuration and tolerance of the recuperator or heat exchanger, the fit up and assembly for use with the engine is insured.

SUMMARY OF THE INVENTION

In one aspect of the invention a circulator core inspection line is comprising of an inlet end having a supply of the circulator cores to be inspected; a test fixture including a base member, a pair of "V" blocks, an anvil member and a plurality of gages; and an outlet end having an acceptable position and a not acceptable position.

In another aspect of the invention a method of inspecting a geometry and dimensional accuracy of a circular recuperator core is defined. The circular recuperator core defining an axis "A", a first end and a second end spaced apart a preestablished length, a preestablished inner diameter centered about the axis "A", a preestablished outside diameter centered about the axis "A", and said circular recuperator core having a donor inlet duct positioned at said first end the centered about the axis "A" and a donor outlet duct positioned at the second end and centered about the axis "A". The method of inspecting the geometry and dimensional accuracy of the circular recuperator core comprising the steps of: positioning the second end of the circular recuperator core on a base member; positioning a first gage within the inner diameter; monitoring the preestablished length for dimensional accuracy using a go, no-go configuration of the first gage; positioning an anvil member within the inner diameter of the circular recuperator core; centering the anvil member within the inner diameter and aligning an axis "SA" of the anvil member to coincide with the axis "A" of the circular recuperator core; monitoring the position and a concentricity of the donor inlet duct using a go, no-go configuration of a second gage; positioning the anvil member within a pair of "V" blocks; monitoring the position and a concentricity of the donor outlet duct using a go, no-go configuration of a third gage; and monitoring the preestablished outside diameter for dimensional accuracy using a go, no-go configuration of a fourth gage.

DETAILED DESCRIPTION

Figure 1:
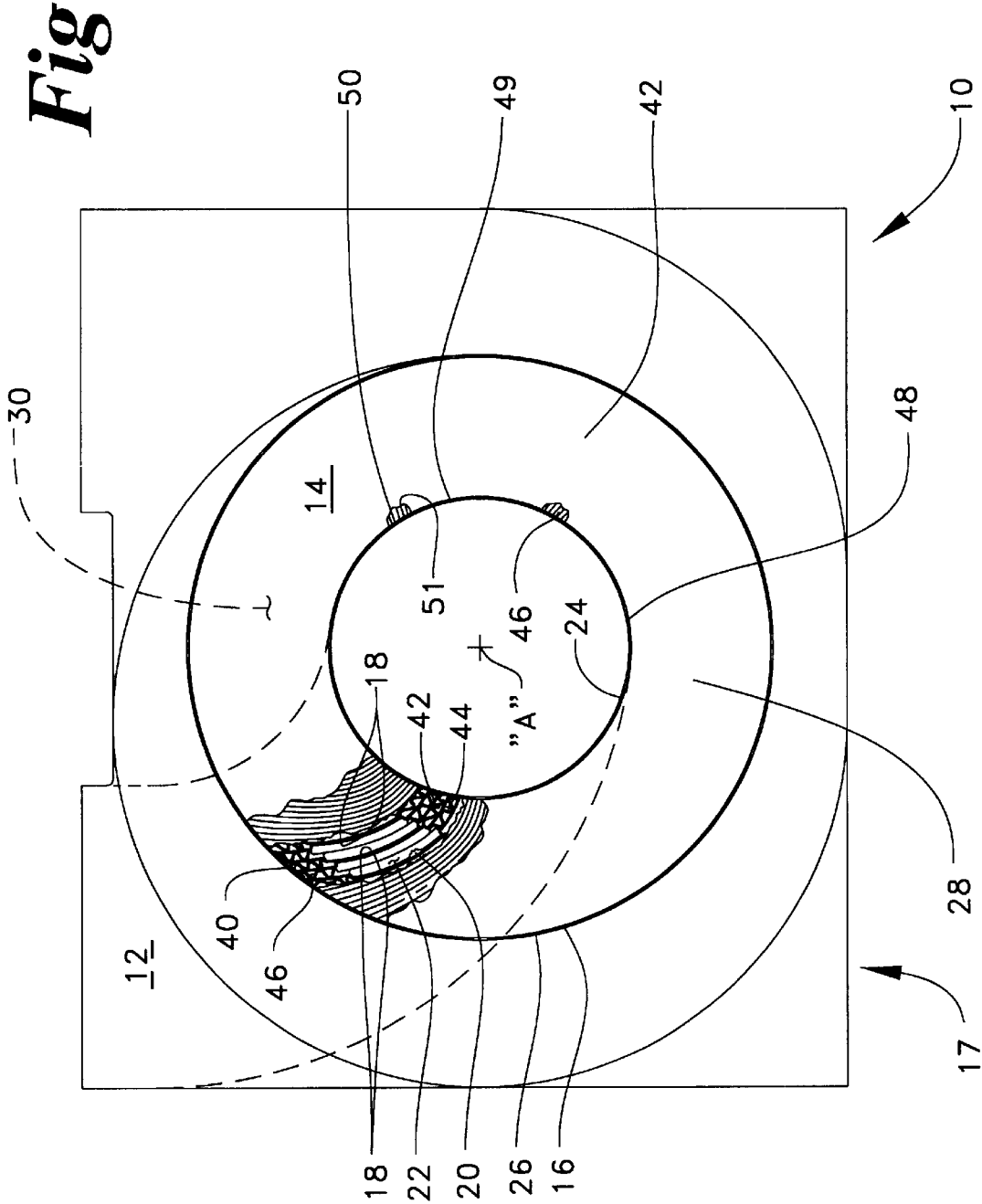
FIG. 1 is a partially sectioned view of an engine having a recuperator therein.

FIG. 1 shows a partially sectioned engine 10. The engine 10 in this application is a gas turbine engine and has a plurality of donor ducts 12 exiting from a turbine exhaust. The engine 10 has a plurality of recipient ducts 14 which communicate to the combustor, not shown. In this application, a core 16 of a recuperator 17 is positioned within a portion of the plurality of recipient ducts 14 and about a portion of the plurality of donor ducts 12. In other applications, the core 16 can be positioned or located differently with respect to the engine and the ducting without diverting from the gist of the invention. The core 16, in this application, has a circular configuration. The core 16 defines a plurality of primary sheets 18 being positioned adjacent each other and forming a plurality of donor passages 20 and a plurality of recipient passages 22. The core 16 has an inner diameter 24 and an outer diameter 26 each having a preestablished diameter and tolerance. The core 16 has a first end 28 and a second end 30. The core 16 has a preestablished length extending between the first end 28 and the second end 30. The plurality of donor passages 20 have an inlet portion 40 positioned at the first end 28 of the core 16. An outlet portion 42 of the plurality of donor passages 20 is positioned at the second end 30 of the core 16. The plurality of recipient passages 22 have an inlet portion 44 located near the second end 30 of the core 16 and an outlet portion 46 located near the first end 28 of the core 16. The core 16 has a donor inlet duct 48 positioned at the inner diameter 24 and at the first end 28. The donor inlet duct 48 has an inside diameter 49 having a preestablished dimension. A donor outlet duct 50 is positioned at the inner diameter 24 and at the second end 30. The donor outlet duct 50 has an inside diameter 51 having a preestablished dimension. In this application, the donor inlet duct 48 and the donor outlet duct 50 are welded to the core 16. The inner diameter 24 of the core 16 and the outer diameter 26 of the core 16 are centered about an axis "A" of the core 16.

Figure 2:
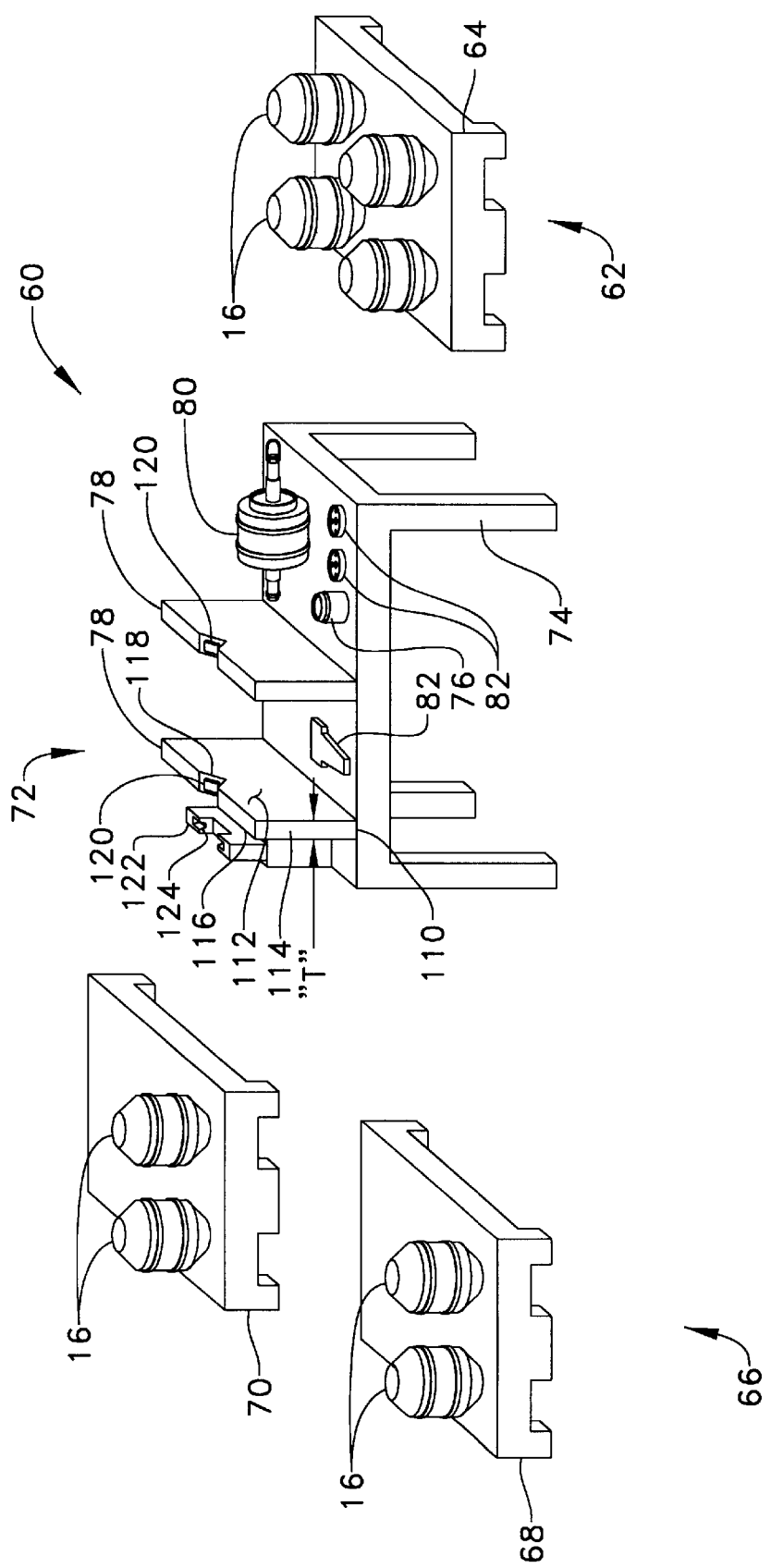
FIG. 2 is a generally schematic view of an inspection line.

An inspection line 60 is shown in FIG. 2. The inspection line 60 has an inlet end 62 having a tub or flat 64 on which are a plurality of the cores 16 to be inspected. At an opposite end to the inlet end 62 of the inspection line 60 is an outlet end 66 having a first tub or flat 68 on which are placed a plurality of cores 16 which are acceptable for use with the engine 10. A second tub or flat 70 is positioned at the outlet end 66 on which are placed a plurality of cores 16 which are not acceptable for use with the engine 10. Interposed the inlet end 62 and the outlet end 66 is a test fixture 72. The inspection line 60 includes a plurality of hand tools, not shown, and a lifting device, such as a hoist, not shown. In the present non-automated system, an inspector is also necessary. However, if one was to automate the inspection line 60 the inspector and the hand tools could be eliminated.

Figure 3:
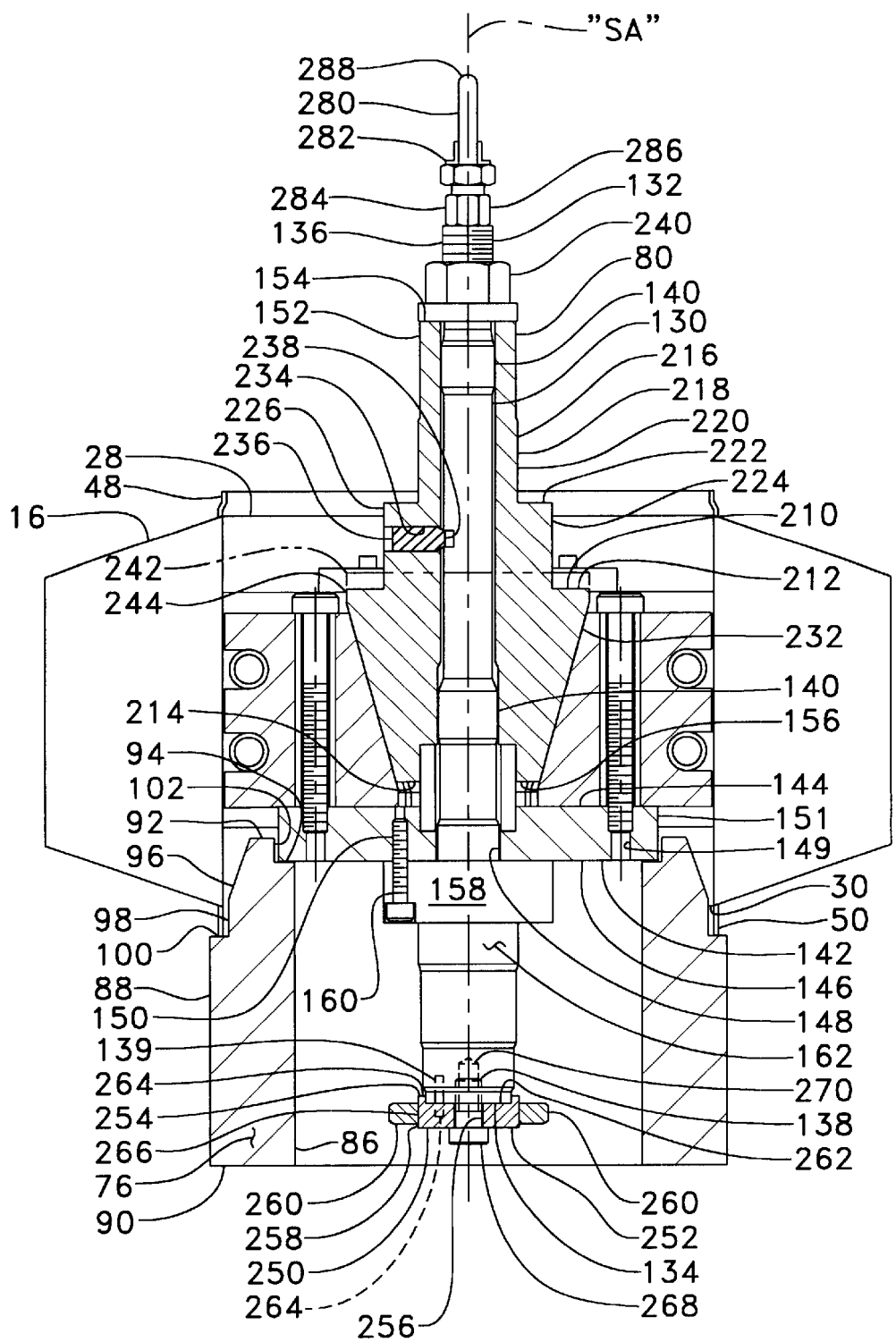
FIG. 3 is a detailed partially sectioned view of a test fixture.

As shown in FIG. 2, the test fixture 72 is positioned on a table 74. The test fixture 72 includes a base member 76, a pair of "V" blocks 78, an anvil member 80 and a plurality of gages 82. The base member 76 is best shown in FIG. 3. The base member 76 of the test fixture 72 has a cylindrical configuration defining an inner diameter 86 and an outer diameter 88. A first end 90 of the base member 76 has a flat configuration. A second end 92 extends axially from the first end 90 a predefined distance and has a stepped configuration. For example, a first ledge 94 is positioned radially outward from the inner diameter 86 a preestablished distance and extend toward the first end 90 a preestablished distance. A tapered portion 96 extends from the second end 92 toward the first end 90 a predetermined distance and terminates at an intermediate diameter 98 positioned radially between the inner diameter 86 and the outer diameter 88. The intermediate diameter 98 terminates at a shelf 100 interposed the second end 92 and the first end 90. The shelf 100 is positioned axially between the first end 90 and the first ledge 94. The first ledge 94 terminates at a diameter 102 positioned intermediate the inner diameter 86 and the outer diameter 88.

The pair of "V" blocks 78 of the test fixture 72 is best shown in FIG. 2. Each of the pair of "V" blocks 78 has a base 110 position on the table 74. A body portion 112 extends from the base 110 and between a pair of sides 114 and terminates at a top surface 116. The body portion 112 has a predefined thickness "T". Positioned in the body portion 112 at the top surface 116 is a notch 118, which in this application has a generally "V" configuration. As an option the notch 118 could have a circular configuration. Each of the pair of "V" blocks are space apart a preestablished distance. A bearing member 120 is positioned in each of the "V" configurations. One of the pair of "V" blocks 78 has a turning portion 122 attached thereto having a slot 124 therein.

Figure 4:
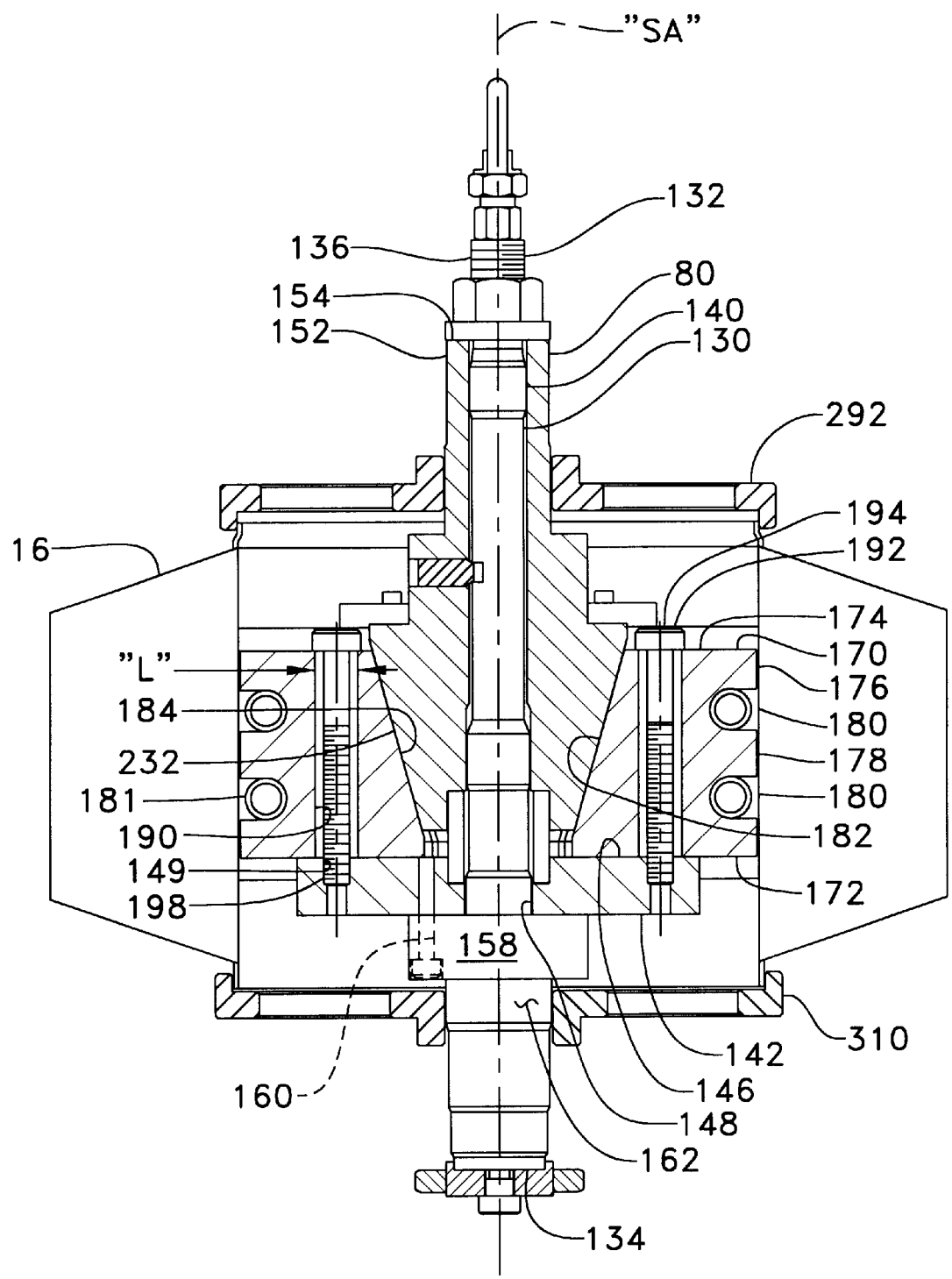
FIG. 4 is a detailed partially sectioned view of the test fixture and a portion of a plurality of gauges thereon.

The anvil member 80 of the test fixture 72 is best shown in FIGS. 3 and 4. The anvil member 80 includes a shaft member 130 centered about an axis "SA" and extends between a first end portion 132 and a second end portion 134. The first end portion 132 of the shaft member 130 has a threaded portion 136 thereon. And, the second end portion 134 of the shaft member 130 has a threaded bore 138 therein centered on the axis "SA". A bore 139 is positioned in the second end 134 and is radially spaced about the axis "SA". Interposed the first end 132 and the second end 134 is a pair of bearing surfaces 140. A plate member 142 is positioned between the first end portion 132 and the second end portion 134. The plate member 142 has a first side 144 and a second side 146 being spaced apart a preestablished distance. A bore 148 extends between the first side 144 and the second side 146 and is centered around the shaft member 130. The plate member 142 has a plurality of first threaded holes 149 radially spaced about the bore 148 and the axis "SA". A plurality of second threaded holes 150 are radially spaced about the bore 148 and the axis "SA" and radially between the bore 148 and the plurality of first threaded holes 149. An outer diameter 151 of the plate member 142 has a preestablished dimension being substantially less than that of the diameter 102 of the base member 76 as will be explained latter. A spacer member 152 is positioned between the plate member 142 and the first end portion 132. The spacer member 152 has a first end 154 being positioned between the first end portion 132 of the shaft member 130 and one of the pair of bearing surfaces 140. A second end 156 of the spacer member 152 is near or in contacting relationship with the first side 144 of the plate member 142.

The anvil member 80 has a flange portion 158 located in contacting relationship with the second side 146 of the plate member 142. The flange portion 158 has a plurality of radially spaced through holes 160 therein. The plurality of radially spaced through holes 160 axially align with the plurality of second threaded holes 150 in the plate member 142. Interposed the flange portion 158 and the second end 156 of the spacer member 152 is a bearing surface 162.

The anvil member 80 includes a plurality of wedge members 170 positioned radially about the axis "SA" of the shaft member 130, as is best shown in FIG. 4. A first surface 172 of each of the plurality of wedge members 170 is positioned in sliding relationship with the second side 146 of the plate member 142. A second surface 174 of each of the plurality of wedge members 170 is space from the first surface 172 a preestablished distance. An outer diameter 176 of each of the plurality of wedge members 170 is radially spaced from the axis "SA" a preestablished distance and forms an outer surface 178 extending between the first surface 172 and the second surface 174. A pair of grooves 180 are positioned in the outer surface 178 intermediate the first surface 172 and the second surface 174. A spring member 181, in this application an o'ring, is positioned in each of the pair of grooves 180. An inner surface 182 of each of the plurality of wedge members 170 extends between the first surface 172 and the second surface 174. The inner surface 182 is radially spaced from the axis "SA" a preestablished distance at the first surface 172. The inner surface 182 is radially spaced from the axis "SA" a preestablished distance at the second surface 174 being greater than that of the radial distance at the first surface 172. Thus, the inner surface 182 of each of the plurality of wedge members 170 defines a frustoconical surface 184 having a frustoconical configuration. An elongated hole 190 is positioned in each of the plurality of wedge members 170. The elongated hole 190 has a preestablished length "L" extending along an axis and a preestablished width "W" extending an equal axial distance from the axis. The elongated hole 190 is positioned relative to a respective one of the plurality of threaded holes 149 in the plate member 142. A threaded member 192 has a head end 194 and is positioned in each of the elongated holes 190. A threaded end 198 is positioned opposite the head end 194 of the threaded member 192 and is threadedly engaged with a respective one of the plurality of threaded holes 149 in the plate member 142.

The spacer member 152 includes a frustoconical member 210 positioned about the shaft member 130, as is shown in FIG. 3. The frustoconical member 210 has a first end 212 and an second end 214, which in this application corresponds to the second end 156 of the spacer member 152. Extending between the first end 212 and the second end 214 and centered on the axis "SA" of the shaft member 130 is a bore 216. The bore 216 is in sliding contacting relationship with the pair of bearing surfaces 140. Extending from the first end 154 of the spacer member 152 is a first diameter 218 forming a first surface 220. The first surface 220 terminates at a first radial surface 222 spaced from the first end 154 a predetermined distance. The first radial surface 222 extends radially to a second diameter 224 which forms a second surface 226. The second surface 226 terminates at the first end 212 of the frustoconical member 210. Extending between the second diameter 224 and the second end 214 is a frustoconical surface 232. The frustoconical surface 232 of the frustoconical member 210 substantially corresponds in configuration to the frustoconical surface 184 of each of the plurality of wedge members 170. A threaded bore 234 is positioned in the second surface 226. A threaded member 236 is positioned in the threaded bore 234 and has a first end 238 which is capable of being forcibly engaged with the shaft member 130 intermediate the pair of bearing surfaces 140. A nut 240 is threadedly positioned on the threaded portion 136 of the shaft member 130. With the nut 240 loose or spaced from the spacer member 152 and the frustoconical surface 232 of the frustoconical member 210 in low force contacting relationship with the frustoconical surface 184 of the plurality of wedge members 170, a low force contacting position 242 is formed, shown in phantom. And, with the nut 240 tight against and applying a force on the spacer member 152 and the frustoconical surface 232 of the frustoconical member 210 in contacting relationship with the frustoconical surface 184 of the plurality of wedge members 170, a centered or high force contacting position 244 is formed.

The anvil member 80 includes a rotating member 250 positioned at the second end 134 of the shaft member 130. The rotating member 250 has a first side 252 and a second side 254 being space apart. A through bore 256 extends between the first side 252 and the second side 254. The rotating member 250 forms a surface 258 therebetween the first side 252 and the second side 254. A pair of tabs 260 extend radical from the surface 258 a preestablished distance. The second side 254 has a recessed portion 262 therein being spaced from the second side 254 a predetermined distance. The recessed portion 262 of the rotating member 250 contacts the second end 134 of the shaft member 130. The recessed portion 262 and the second side 254 form a ridge portion 264. The ridge portion 264 is radially spaced about the second end 134 of the shaft member 130 with the rotating member 250 assembled to the shaft member 130. With the rotating member 250 assembled to the shaft member 130, a bolt 268 is positioned in the through bore 256 and a threaded end 270 of the bolt 268 engages the threaded bore 138 in the second end 134 of the shaft member 130.

The anvil member 80 includes a lifting member 280 positioned at the first end 132 of the shaft member 130. The lifting member 280 has a first end 282 and a second end 284. The second end 284 has a threaded portion 286 adapted to threadedly engage the threaded portion 136 of the first end 132 of the shaft member 130. The first end 282 of the lifting member 280 has a swivel member 288 attached thereto in a conventional manner.

Figure 5:
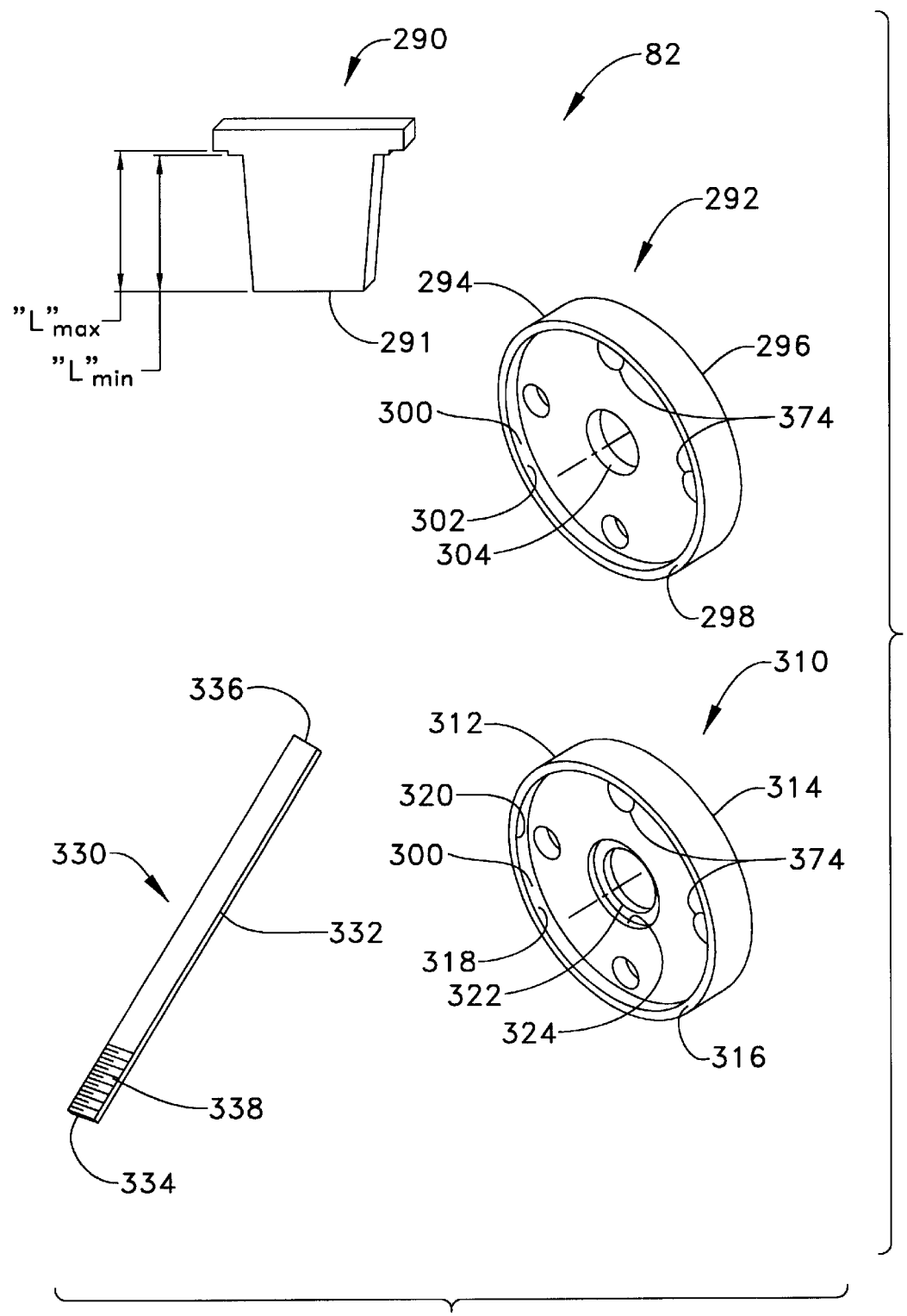
FIG. 5 is a view of the plurality of gauges.

The plurality of gages 82, as best shown in FIGS. 4 and 5, include a combination of go, no-go parameters. For example, a first gage 290 of the plurality of gages 82 has a go, no-go parameter defined for the length "L" of the core 16 between the first side 28 and the second side 30. The first gage 290 has a first end 291 for which the distance designated as "L" being between the minimum "Lmim" and maximum "Lmax" size acceptable for the length of the core 16. The plurality of gages 82 also includes a second gage 292 and is made from a plate 294. The plate 294 has a first side 296 and a second side 298. Interposed the first side 296 and the second side 298 is a stepped portion 300. The stepped portion 300 is positioned near the second side 298. The stepped portion 300 has a diameter 302 which defines the maximum acceptable diameter of the donor inlet duct 48. The second gage 292 has a central bore 304 which is slidably positioned about the first surface 220 of the spacer member 152. The dimensional characteristics of the central bore 304 and the stepped portion 300 define the concentricity of the donor inlet duct 48 to the axis "A" of the core 16. A third gage 310 of the plurality of gages 82 is made from a plate 312. The plate 312 has a first side 314 and a second side 316. Interposed the first side 314 and the second side 316 is a stepped portion 318. The stepped portion 318 is positioned near the second end 316. The stepped portion 318 has a diameter 320 which defines the maximum acceptable diameter of the donor outlet duct 50. The third gage 310 has a central bore 322 which is slidably positioned about the bearing surface 162 of the shaft member 130. The dimensional characteristics of the central bore 322 and the stepped portion 318 define the concentricity of the donor outlet duct 50 to the axis "A" of the core 16. The central bore 322 has a recess 324 therein. A fourth gage 330 of the plurality of gages 82 includes a flexible tape 332 having a preestablished length. The flexible tape 332 has a first end 334 and a second end 336 between which is defined a preestablished length. The first end 334 of the flexible tape 332 has a go, no-go portion 338 thereon marked with an acceptable length. For example, such an acceptable length is color coded as green for acceptable and red for not acceptable. Other types of marking can be used such as band length or numerical markings.

Figure 6:
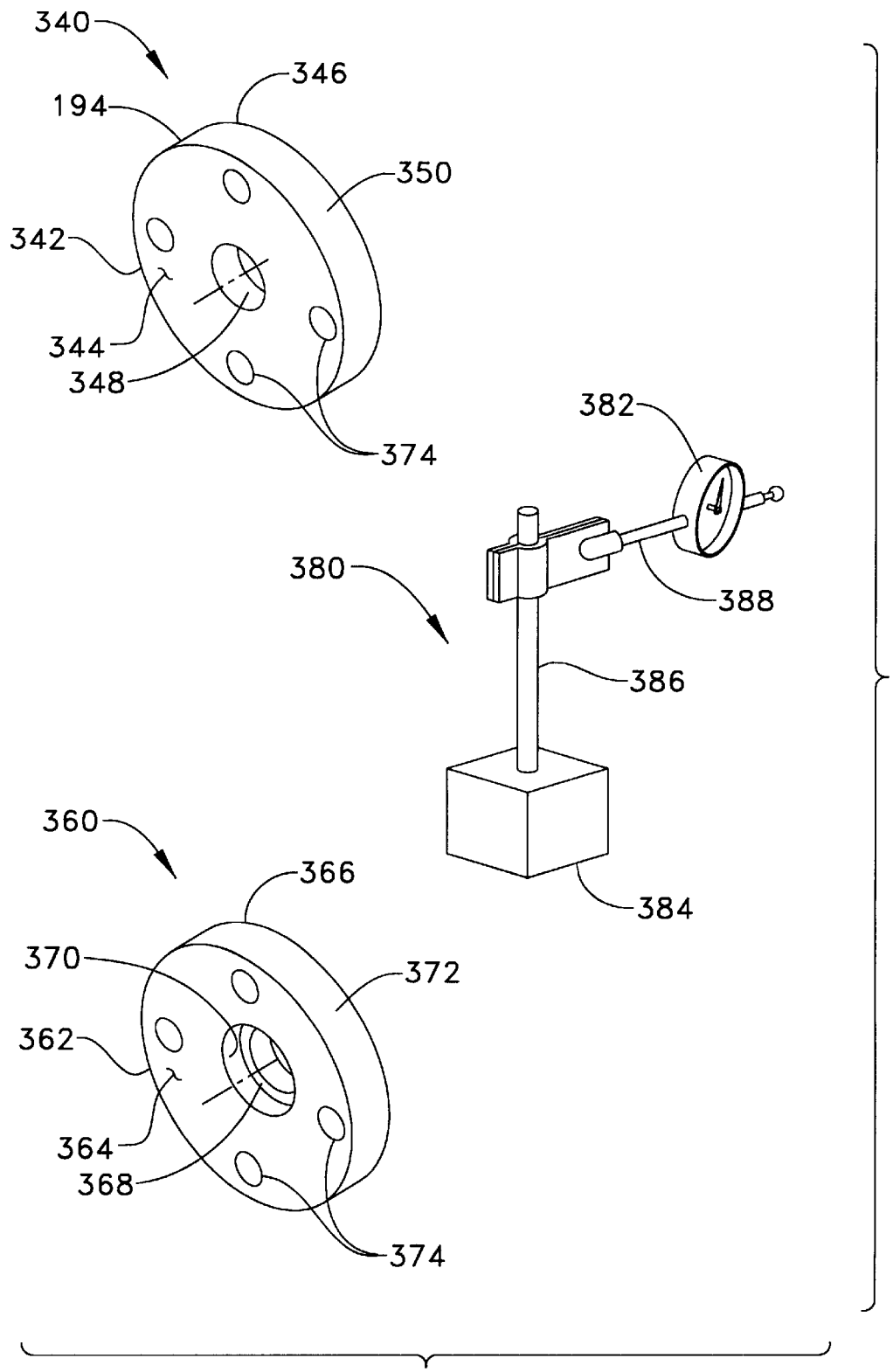
FIG. 6 is another view of the plurality of gauges.

A fifth gage 340 of the plurality of gages 82, as best shown in FIG. 6, is made from a plate 342. The plate 342 has a first side 344 and a second side 346. A central bore 348 extends between the first side 344 and the second side 346. The central bore 348 which is slidably positioned about the first surface 220 of the spacer member 152. The fifth gage 340 has an outside diameter 350 being concentric with the central bore 348 which in operation is concentric with the axis "SA" of the shaft member 130. The outside diameter 350 is substantially equal to the inside diameter 49 of the donor inlet duct 48.

A sixth gage 360 of the plurality of gages 82, as best shown in FIG. 6, is made from a plate 362. The plate 362 has a first side 364 and a second side 366. A central bore 368 extends between the first side 364 and the second side 366. The central bore 368 has a recessed portion 370 which is slidably positioned about flange portion 158. The sixth gage 360 has an outside diameter 372 being concentric with the central bore 368 which in operation is concentric with the axis "SA". The outside diameter 372 is substantially equal to the inside diameter 51 of the donor outlet duct 50. A plurality of lightening holes 374 are positioned in each of the second gage 292, third gage 310, fifth gage 340 and the sixth gage 360.

A seventh gage 380 of the plurality of gages 82, as best shown in FIG. 6, includes a dial indicator 382, a support block 384 having an arm 386 extending therefrom and an adjustable member 388 slidably attached to the arm 386.

Industrial Applicability

In operation, the inspection line 60 is used to insure that the core 16 of the recuperator 17 is usable and will fit in its designated area and within the restraints of the engine 10. Prior to inspecting the core 16, the base member 76 is placed on the table 74 with the first end 90 contacting the table 74. The core 16 is removed from the flat 64 at the inlet end 62 of the inspection line 60. The core 16 is positioned on the base member 76 with the one of the donor inlet duct 48 and the donor outlet duct 50 positioned over the intermediate diameter 98 and in contact with the shelf 100 of the base member 76. Thus, the core 16 is generally centered on the base member 76.

Using the first gage 290, the length of the core 16 is inspected. For example, the first end 291 is positioned in contacting relationship with the first end 90 of the base member 76. And, if the length of the core 16 falls within the distance "Lmax" and "Lmin" the core 16 is acceptable. Thus, the core 16 will fit within the parameters for use with the recuperator 17.

The next step in inspecting the core 16 with the inspection line 60 is, with the anvil member 80 in the low force contacting position 242, to insert the anvil member 80 within the inner diameter 24 of the core 16. The first side 144 of the plate 142 is positioned in contacting relationship with the first ledge 94 of the base member 76 and a portion of the anvil member 80 extends into the inner diameter 86 of the base member 76. Thus, the outer diameter 151 fits loosely within the diameter 102 at which the first ledge 94 terminates since the dimension of the outer diameter 151 of the plate 142 is substantially less than the dimension of the diameter 102 at which the first ledge 94 terminates. Next, the nut 240 is tightened on the threaded portion 136 of the shaft member 130. And, with the flange portion 158 in contacting relationship with the second side 146 of the plate member 142 the spacer member 152 is forced toward the plate member 142. Thus, the frustoconical surface 232 on the frustoconical member 210 contacts the frustoconical surface 184 of each of the plurality of wedge members 170 moving the frustoconical members 210 from the low force contacting position 242 to the centered or high force contacting position 244. As the shaft member 130 moves axially along the axis "SA" and slides along the pair of bearing surfaces 140, the axis "SA" of the shaft member 130 becomes aligned and coincides with the axis "A" of the core 16.

With the axis "A" and the axis "SA" coinciding the second gage 292 is positioned about the spacer member 152. The central bore 304 of the second gage 292 is positioned about the first surface 220 of the first diameter 218 of the spacer member 152. The diameter 302 of the stepped portion 300 is positioned about the outside diameter 49 of the donor inlet duct 48. If the diameter 302 of the stepped portion 300 passes over the outside diameter 49 of the donor inlet duct 48 the core 16 is acceptable. However, if the diameter 302 of the stepped portion 300 does not pass over the outside diameter 49 of the donor inlet duct 48 the core is not acceptable. The second gage 292 is removed from the shaft member 130 and the fifth gage 340 is positioned on the shaft member 130. For example, the central bore 348 is positioned about the first surface 220 of the first diameter 218 of the shaft member 130. And, with the outside diameter 350 being concentric with the axis "SA" the concentricity of the outer diameter 49 of the donor inlet duct 48 can be inspected. If the concentricity is within a preestablished variable the core 16 is accepted. However, if the concentricity is not with the preestablished variable the core is not accepted. The fifth gage 340 is removed.

The central bore 322 of the third gage 310 is positioned about the bearing surface 162 of the shaft member 130. The recess 324 is positioned about the flange portion 158 and the diameter 320 of the stepped portion 318 is positioned about the outside diameter 51 of the donor outlet duct 50. If the diameter 320 of the stepped portion 318 passes over the outside diameter 51 of the donor outlet duct 50 the core 16 is acceptable. However, if the diameter 320 of the stepped portion 318 does not pass over the outside diameter 51 of the donor outlet duct 50 the core is not acceptable.

The third gage 310 is removed from the shaft member 130 and the sixth gage 360 is installed on the shaft member 130. The central bore 368 of the sixth gage 360 is positioned about the bearing surface 162 of the shaft member 130. The recess 370 is positioned about the flange portion 158. And, with the outside diameter 372 being concentric with the axis "SA" the concentricity of the outer diameter 51 of the donor outlet duct 50 can be inspected. If the concentricity is within a preestablished variable the core 16 is accepted. However, if the concentricity is not within the preestablished variable the core is not accepted. The sixth gage 360 is removed.

The second gage 292 and the third gage 310 are repositioned on the shaft member 130. The lifting device is attached to the lifting member 280, the anvil member 80, the core 16 and the second gage 292 and the third gage 310 are lifted from the table 74. The pair of tabs 260 are positioned in the slot 124 of the turning portion 122. And, the spacer member 152 near the first end portion 154 of the anvil member 80 and the anvil member 80 near the second end portion 134 of the shaft member 130 are positioned in the notch 118 of the of each of the pair of "V" blocks 78. In this position, the perpendicularity of the core 16 to the centerline or axis "A" is inspected using the seventy gage 380. For example, the support block 384 is positioned on the table 74. The adjustable member 388 is positioned on the arm 386 and the dial indicator 382 is operatively positioned between the adjustable member 388 and the third gage 310. The dial indicator 382 defines a go, no-go parameter of the perpendicularity between the axis "A" and one of the first end 28 and the second end 30.

With the core 16 in the pair of "V" blocks 78, the outer diameter 26 of the core 16 can be inspected. For example, the fourth gage 330 is positioned about the outer diameter 26 of core 16. The flexible tape 332 is formed to accept the configuration of the core 16 and second end 336 is positioned within the go, no-go portion 336 near the first end 334. Depending on the position of the second end 336, the outer diameter 26 of the core 16 is either acceptable or non-acceptable.

Thus, the inspection line 60 effectively and efficiently determines the geometry and dimensional accuracy of the core 16 prior to being installed in the recuperator 17. Good cores 16 are shipped and bad cores 16 are repaired or scrapped. The plurality of gages 82 determine the go, no-go characteristics of the components making up the core and the assembly thereof these components. For example, the length of the core 16 is inspected. The size and concentricity or true position of the donor inlet duct 48 and the donor outlet duct 50 with respect to the axis "A" of the core 16 is respectively inspected. The perpendicularity of the core 13 to the centerline or axis "A" is inspected. And, the outer diameter 26 of the core 16 is inspected. With the above inspection, the core 16 can operatively be used with the engine 10 and positioned in the recuperator 17 to mate or match up with the plurality of donor ducts and the plurality of recipient ducts.

Other aspects, objects and advantages of this invention can be obtained from a study of the drawings, the disclosure and the appended claims.

What is claimed is:

1. A method of inspecting a geometry and dimensional accuracy of a circular recuperator core, said circular recuperator core defining an axis "A", a first end and a second end spaced apart a preestablished length, a preestablished inner diameter centered about said axis "A", a preestablished outside diameter centered about said axis "A", and said circular recuperator core having a donor inlet duct positioned at said first end and centered about said axis "A" and a donor outlet duct positioned at said second end and centered about said axis "A"; said method of inspecting said geometry and dimensional accuracy of said circular recuperator core comprising the steps of:

positioning said second end of said circular recuperator core on a base member;

positioning a first gage within said inner diameter;

monitoring said preestablished length for dimensional accuracy using a go, no-go configuration of said first gage;

positioning an anvil member within said inner diameter of said circular recuperator core;

centering said anvil member within said inner diameter and aligning an axis "SA" of said anvil member to coincide with said axis "A" of said circular recuperator core;

monitoring said position and a concentricity of said donor inlet duct using a go, no-go configuration of a second gage;

positioning said anvil member within a pair of "V" blocks;

monitoring said position and a concentricity of said donor outlet duct using a go, no-go configuration of a third gage; and monitoring said preestablished outside diameter for dimensional accuracy using a go, no-go configuration of a fourth gage.

2. The method of inspecting a geometry and dimensional accuracy of a circular recuperator core of claim 1 wherein said step of positioning said second end of said circular recuperator core on a base member includes said base member having a shelf thereon and said donor outlet duct contacting said shelf.

3. The method of inspecting a geometry and dimensional accuracy of a circular recuperator core of claim 2 wherein said step of positioning said second end of said circular recuperator core on a base member includes said base member having an intermediate diameter thereon generally centering said circular recuperator core on said base member.

4. The method of inspecting a geometry and dimensional accuracy of a circular recuperator core of claim 1 wherein said step of centering said anvil member within said inner diameter and aligning an axis "SA" of said anvil member to coincide with said axis "A" of said circular recuperator core includes said base member having an inner diameter and said anvil member extending into said inner diameter and said base member having a first ledge thereon and said anvil member contacting said first ledge.

5. The method of inspecting a geometry and dimensional accuracy of a circular recuperator core of claim 4 wherein said step of centering said anvil member within said inner diameter and aligning an axis "SA" of said anvil member to coincide with said axis "A" of said circular recuperator core includes said first ledge of said base member terminating at a diameter, said anvil member includes a plate member defining an outer diameter, a first side and a second side and a dimension of said outer diameter of said plate member being substantially less than a dimension of said diameter of said base member and said second side of said plate member contacting said first ledge of said base member.

6. The method of inspecting a geometry and dimensional accuracy of a circular recuperator core of claim 1 wherein said step of centering said anvil member within said inner diameter and aligning an axis "SA" of said anvil member to coincide with said axis "A" of said circular recuperator core includes said anvil member having a shaft member slidably positioned within a bore of a spacer member, said spacer member includes a frustoconical member having a frustoconical surface thereon, a plurality of wedge members are positioned radially about said spacer member, each of said plurality of wedge members define a first surface and a second surface spaced apart a preestablished distance, an inner surface extends between the first surface and the second surface that defines a frustoconical surface, and lineal movement along said axis "A" of said shaft member within said plurality of wedges members defines one of a low force contacting position and a centered or high force contacting position.

7. The method of inspecting a geometry and dimensional accuracy of a circular recuperator core of claim 6 wherein said step of centering said anvil member within said inner diameter and aligning an axis "SA" of said anvil member to coincide with said axis "A" of said circular recuperator core includes said plurality of wedge members having a pair of grooves positioned therein intermediate said first surface and said second surface and a spring member being positioned within each of said pair of grooves, said spring member urging said plurality of wedge members toward said low force contacting position.

8. The method of inspecting a geometry and dimensional accuracy of a circular recuperator core of claim 1 wherein said step of monitoring said position and a concentricity of said donor inlet duct using a go, no-go configuration of a fifth gage includes positioning a central bore of said fifth gage about a first surface of a first diameter of said anvil member and positioning an outside diameter of said fifth gage concentric with said donor inlet duct, and said concentricity being inspected by comparing said outside diameter of said fifth gage with said outside diameter of said donor inlet duct defining said go, no-go geometry and dimensional accuracy of said concentricity.

9. The method of inspecting a geometry and dimensional accuracy of a circular recuperator core of claim 1 wherein said step of monitoring said position and a concentricity of said donor outlet duct using a go, no-go configuration of one of a gage of a plurality of gages includes positioning a central bore of one of said gage about a bearing surface of said anvil member and positioning an outside diameter of said one of gage concentric with said donor outlet duct, and said concentricity being inspected by comparing said outside diameter of one of said gage with said outside diameter of said donor outlet duct defining said go, no-go geometry and dimensional accuracy of said concentricity.

10. The method of inspecting a geometry and dimensional accuracy of a circular recuperator core of claim 1 wherein said step of monitoring said preestablished outside diameter for dimensional accuracy using a go, no-go configuration of a fourth gage includes said fourth gage being flexible.

11. The method of inspecting a geometry and dimensional accuracy of a circular recuperator core of claim 1 wherein said step of monitoring said preestablished outside diameter for dimensional accuracy using a go, no-go configuration of a fourth gage includes said fourth gage being a color coded to define said go, no-go configuration.

12. The method of inspecting a geometry and dimensional accuracy of a circular recuperator core of claim 1 including the step of monitoring a perpendicularity of one of said first end and said second end.

13. The method of inspecting a geometry and dimensional accuracy of a circular recuperator core of claim 12 wherein said step of monitoring a perpendicularity of one of said first end and said second end includes centering a shaft member within said core and aligning said axis "A" of said core with an axis "SA" of said shaft member.

14. The method of inspecting a geometry and dimensional accuracy of a circular recuperator core of claim 13 wherein said step of monitoring a perpendicularity of one of said first end and said second end includes positioning said core between a pair of "V" blocks and positioning said shaft member within a notch in each of said pair of "V" blocks.

15. The method of inspecting geometry and dimensional accuracy of a circular recuperator core of claim 14 wherein said step of monitoring a perpendicularity of one of said first end and said second end includes one of a gage of a plurality of gages having a base member to which is slidably attached an arm having a dial indicator positioned between said arm and said core.

16. The method of inspecting geometry and dimensional accuracy of a circular recuperator core of claim 15 wherein said step of monitoring a perpendicularity of one of said first end and said second end includes said dial indicator defining a go no-go parameter of the perpendicularity between the axis "A" and said one of said first end and said second end.

* * * * *